United States Patent
Sun (10) Patent No.: US 10,471,582 B2
(45) Date of Patent: Nov. 12, 2019

(54) HANDHELD POWER TOOL

(71) Applicant: STORM PNEUMATIC TOOL CO., LTD., Taichung (TW)

(72) Inventor: Yung Yung Sun, Taichung (TW)

(73) Assignee: Storm Pneumatic Tool Co., Ltd., Taichung (TW)

(*) Notice: Subject to any disclaimer, the term of this patent is extended or adjusted under 35 U.S.C. 154(b) by 228 days.

(21) Appl. No.: 15/643,747

(22) Filed: Jul. 7, 2017

(65) Prior Publication Data

US 2019/0009399 A1   Jan. 10, 2019

(51) Int. Cl.
  *B25F 5/02*    (2006.01)
  *B23D 45/16*   (2006.01)
  *B24B 27/08*   (2006.01)

(52) U.S. Cl.
  CPC ............ *B25F 5/02* (2013.01); *B23D 45/16* (2013.01); *B24B 27/08* (2013.01)

(58) Field of Classification Search
  CPC ............ B25F 5/02; B23D 45/16; B24B 27/08
  USPC .......................................... 173/213, 90, 93.5
  See application file for complete search history.

(56) References Cited

U.S. PATENT DOCUMENTS

| | | | | |
|---|---|---|---|---|
| 7,310,879 | B1* | 12/2007 | Clarke | B23D 45/16 30/122 |
| 2005/0044728 | A1* | 3/2005 | Baker | B23B 45/003 30/390 |
| 2005/0272350 | A1* | 12/2005 | Harwath-Seyfried | B23C 1/20 451/28 |
| 2007/0298696 | A1* | 12/2007 | Blatz | B23Q 11/06 451/358 |

* cited by examiner

*Primary Examiner* — Nathaniel C Chukwurah
(74) *Attorney, Agent, or Firm* — Rosenberg, Klein & Lee (57) ABSTRACT

A handheld power tool includes a main body that contains a driving unit having a driving shaft that passes through a connecting seat and a connector and is connected to a workpiece. The connector has a ball seat swingably received in a ball socket of the connecting seat. A clamp mounted around the connecting seat serves to limit retaining balls arranged between the ball seat and the connecting seat. The connecting seat has an end cap. After the connector is angled as desired, the adjusting member constricts the clamp, and radially presses the retaining balls against the ball seat through the spring leaf, thereby fastening the connector firmly and preventing the workpiece from jigging during operation.

6 Claims, 12 Drawing Sheets

HANDHELD POWER TOOL

BACKGROUND OF THE INVENTION

1. Technical Field

The present invention relates to power tools, and more particularly to a handheld power tool.

2. Description of Related Art

Figure 9:
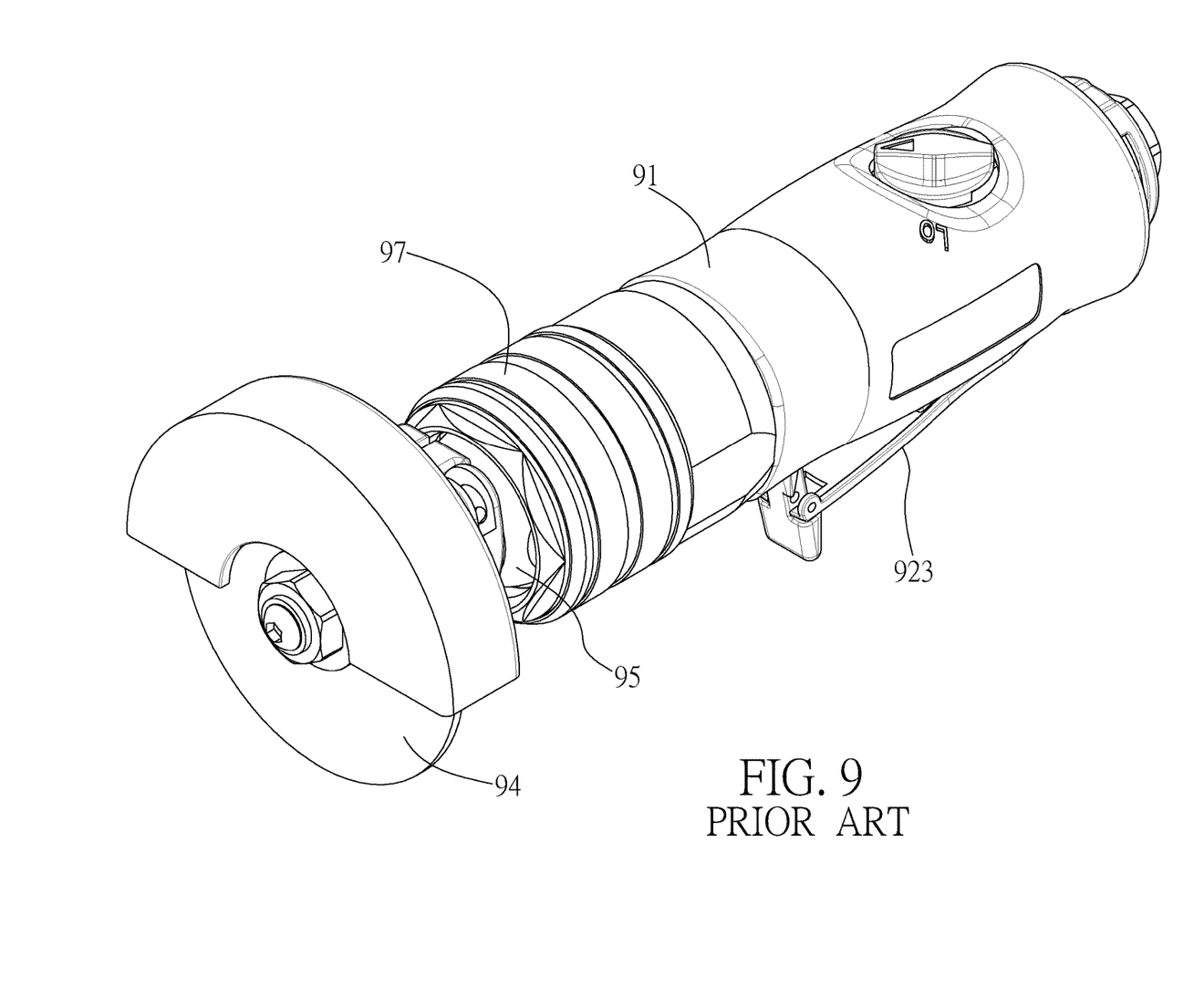
FIG. 9 is a perspective view of a conventional pneumatic cutting machine.
Figure 10:
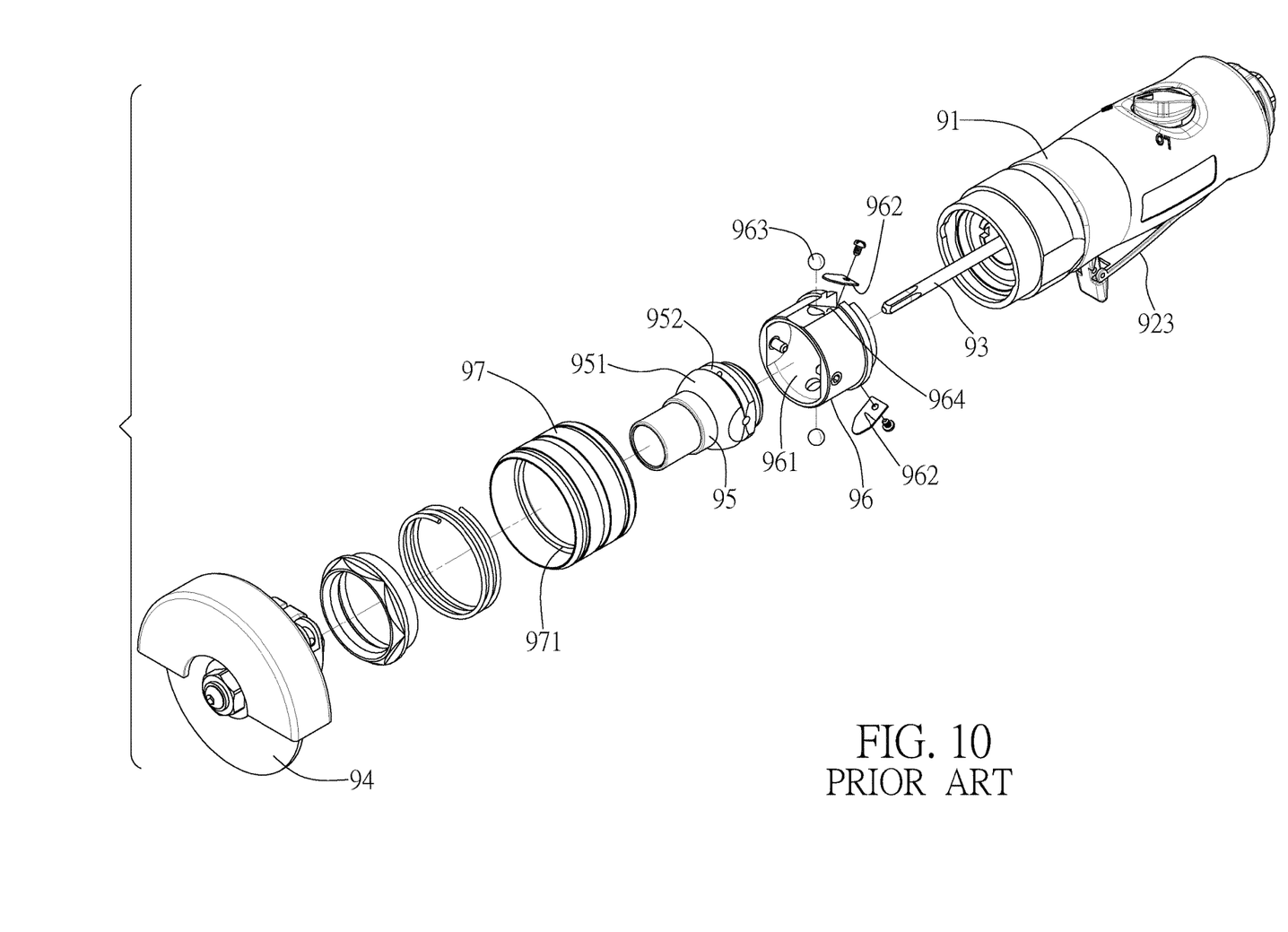
FIG. 10 is an exploded view of the conventional pneumatic cutting machine.

As shown in FIGS. 9 and 10, a conventional handheld power tool, which is a pneumatic cutting machine here for example, has a main body 91 installed therein with a driving unit 92. The driving unit 92 comprises a pneumatic motor 921, an air valve 922 and a pressing handle 923. There is a driving shaft 93 connected to the pneumatic motor 921, and the driving shaft 93 has its one end provided with a cutting blade 94, so that the driving unit 92 rotates the cutting blade 94 to cut objects.

Figure 11:
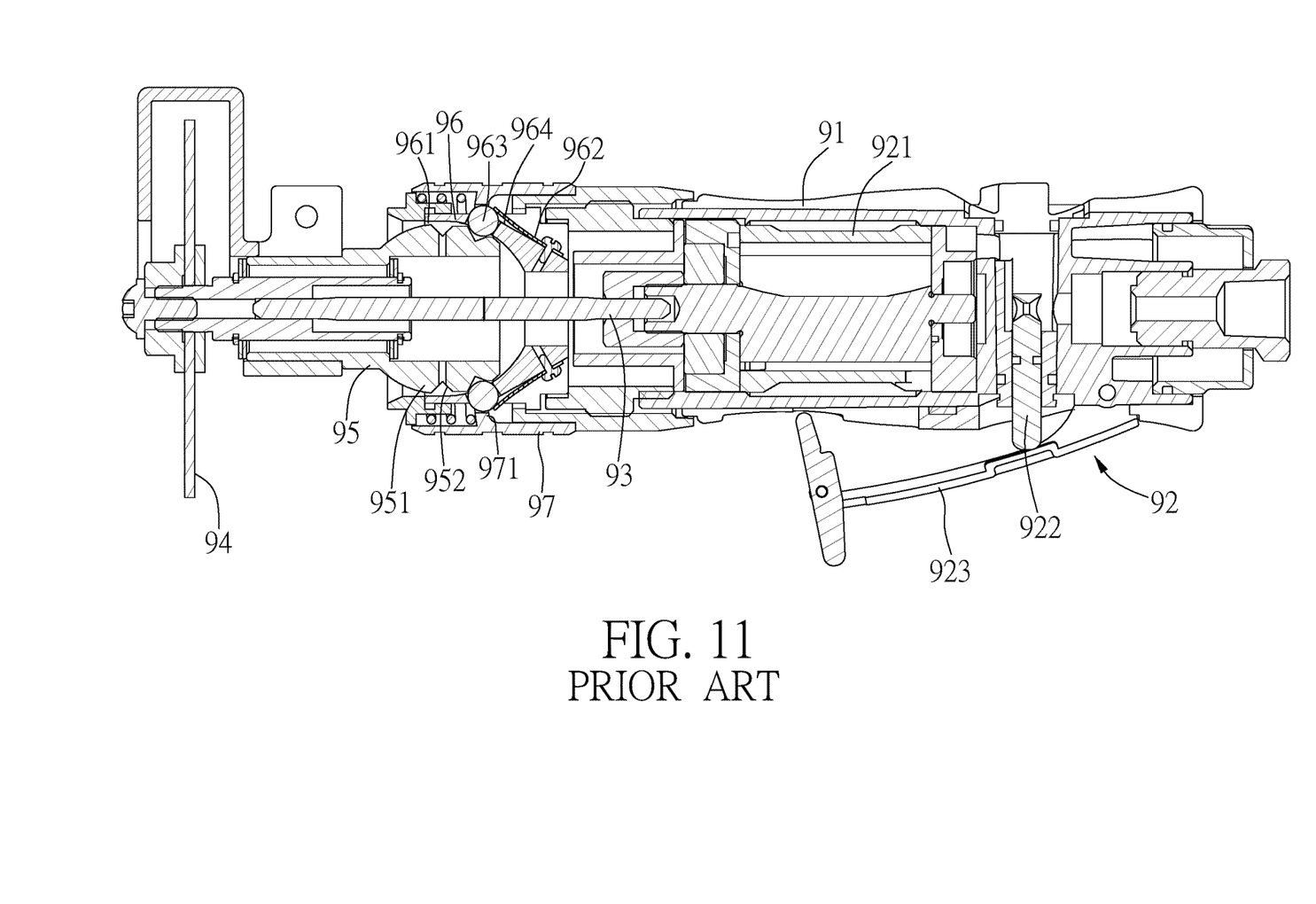
FIG. 11 is a cross-sectional view of the conventional pneumatic cutting machine.
Figure 12:
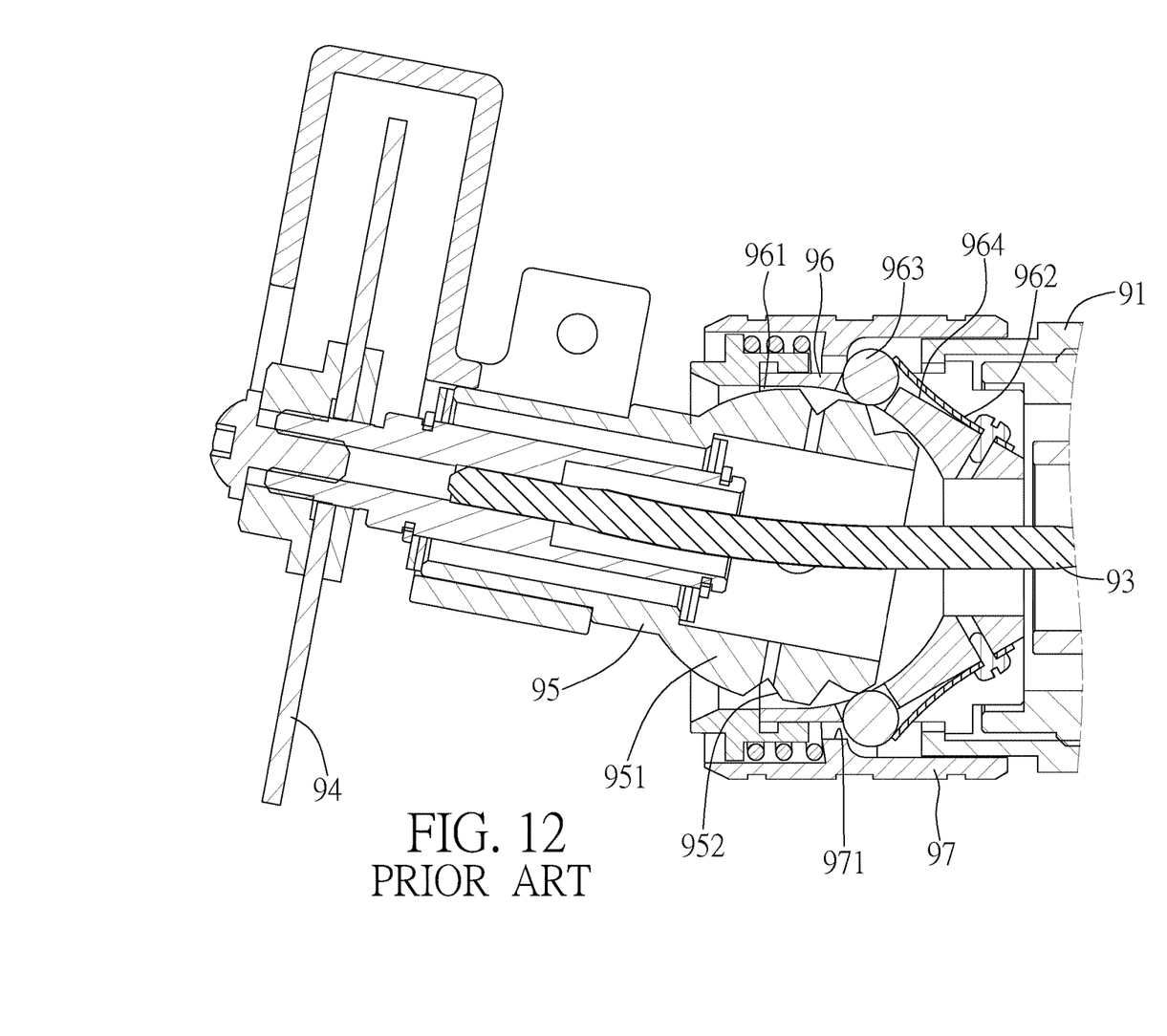
FIG. 12 is a cross-sectional view of the conventional pneumatic cutting machine showing a connector in FIG. 11 tilted up with respect to the connecting seat.

As shown in FIGS. 11 and 12, the cutting blade 94 is axially connected to a connector 95 that has a ball seat 951. In addition, the connecting seat 96 at the main body 91 has a ball socket 961. The ball seat 951 is received in the ball socket 961, so that when the connector 95 is tilted, it can be positioned, thereby holding the angle of the cutting blade 94. As shown in FIG. 12, what allows the connector 95 to be tilted is a spring leaf 962 of the connecting seat 96 pressing retaining balls 963 against an incline 952 formed on the ball seat 951, so that when a sliding sleeve 97 moves left to a releasing position, the retaining balls 963 are no more retained by the annular wall 971 and can be pushed away, and that when the sliding sleeve 97 moves right to a fastening position, the retaining balls 963 are retained by the annular wall 971 and cannot be pushed away, thereby holding the connector 95 firmly in the ball socket 961.

However, since the annular wall 971 raised from the sliding sleeve 97 has its height fixed, and the retaining balls 963 as well as the connector 95 are made without flexibility, in order for the annular wall 971 to exactly retain the retaining balls 963 at the fastening position, the connector 95, the retaining balls 963, the sliding sleeve 97, and particularly the incline 952 of the ball seat 951 as well as the annular wall 971 of the sliding sleeve 97 have to be made with high-level precision. Nevertheless, the connecting seat 96 is a spring leaf 962 fixed by a screw, so the incline 964 has to be drilled and tapped, making the manufacturing difficult. After the incline 952 is processed, since the ball seat 951 is a ball-like structure and difficult to stay still, it is hard to measure the incline 952. Therefore, it is a common problem in practice that the connector 95, the retaining balls 963, the connecting seat 96 and the sliding sleeve 97 are made without meeting the preciseness requirements in term of dimensions. As a result, a gap exists between the annular wall 971 and the retaining balls 963 and impairs firm combination, leading to a jigging cutting blade 94 during operation.

BRIEF SUMMARY OF THE INVENTION

The primary objective of the present invention is to solve the foregoing problem by providing a handheld power tool, which has a clamp that ensure a ball seat getting firmly held in a ball socket of a connecting seat by retaining balls, thereby preventing its workpiece from jigging during operation.

For achieving the objective, the disclosed device comprises:
a main body, containing therein a driving unit, and having a working end, the driving unit including a driving shaft that extends toward the working end, and the driving shaft being flexible and bendable;
a connecting seat, being attached to the working end of the main body, and having a radially inward extending ball socket and a plurality of through holes at least arranged at two opposite sides thereof, wherein the through holes extend radially and communicate with the ball socket;
a connector, having a ball seat received in the ball socket and having two opposite sides thereof pivotally connected to the connecting seat so as to be swingable, the ball seat having an outer periphery thereof formed with a plurality of inclines axially extending and arranged in tandem, wherein the inclines are alternately aligned with the through holes as the ball seat swings;
a clamp, being mounted around an outer periphery of the connecting seat, and being C-shaped with a gap formed between two ends thereof, wherein each of the two ends is provided with a raised portion;
an adjusting member, having a stem that passes through the two raised portions and having a driving portion connected to one end of the stem for drawing the two raised portions close to finally abut against each other or separating the two raised portions far away, so as to size the gap and in turn make the clamp constricted or released, and the clamp further having a spring leaf that covers the through holes;
a plurality of retaining balls, being each received in a respective said through hole and retained by the clamp so as to fall on the incline aligned with the through holes, wherein when the clamp is constricted, the spring leaf of the clamp presses the retaining balls radially against the incline, so as to hold the ball seat within the ball socket; and
an end cap, being attached to one end of the connecting seat where the connector juts out; and
a workpiece, being rotatably connected to the connector, wherein the driving shaft passes through the connecting seat and the connector before transmissibly connected to the workpiece.

Therein, the adjusting member is a quick release, and the driving portion is a cam lever, in which the stem is a bolt screwed to the driving portion has an end opposite to the driving portion formed with a retaining portion, so that screwing or unscrewing the stem changes a distance between the retaining portion and the driving portion, and the driving portion when operated makes the two raised portions drawn close to finally abut against each other or separated far away fast.

Therein, the spring leaf is C-shaped with a gap formed between two ends thereof and has one end thereof formed with an inward extending retaining member, while the connecting seat has an outer periphery thereof circled by the clamp formed with a recessed portion, so that when the spring leaf is located in the clamp, the retaining member is received by the recessed portion, thereby preventing the spring leaf from rotating with respect to the connecting seat.

Therein, the clamp has an inner periphery thereof formed with a first annular wall that has one side thereof formed with a first annular trough for receiving the spring leaf and has an opposite side formed with a second annular trough for receiving the end cap.

Therein, the end cap has an outer periphery thereof provided with a second annular wall that retains the clamp when the end cap is attached to the end of the connecting seat.

wherein the ball seat has two annular grooves arranged in tandem, each of which has a pair of said inclines, and the ball seat additionally has one said incline at an end thereof that is received in the ball socket.

DETAILED DESCRIPTION OF THE INVENTION

Referring to FIG. 1 through FIG. 8, the shown preferred embodiment when read with the accompanying drawings is made to clearly exhibit the above-mentioned and other technical contents, features and effects of the present invention. However, the embodiment is intended for reference and illustration, but not to limit the present invention.

Figure 1:
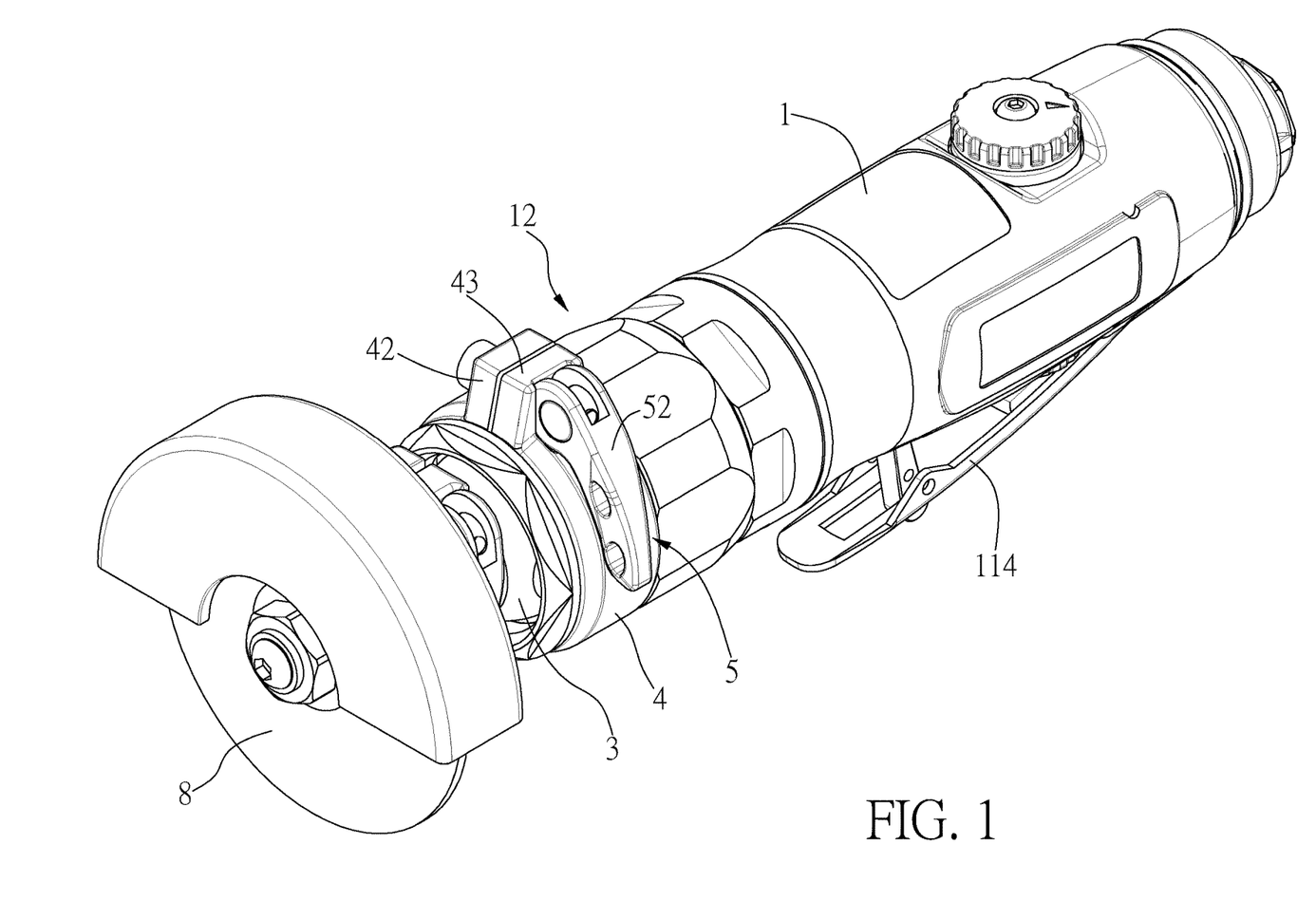
FIG. 1 is a perspective view of a handheld power tool according to a preferred embodiment of the present invention.
Figure 2:
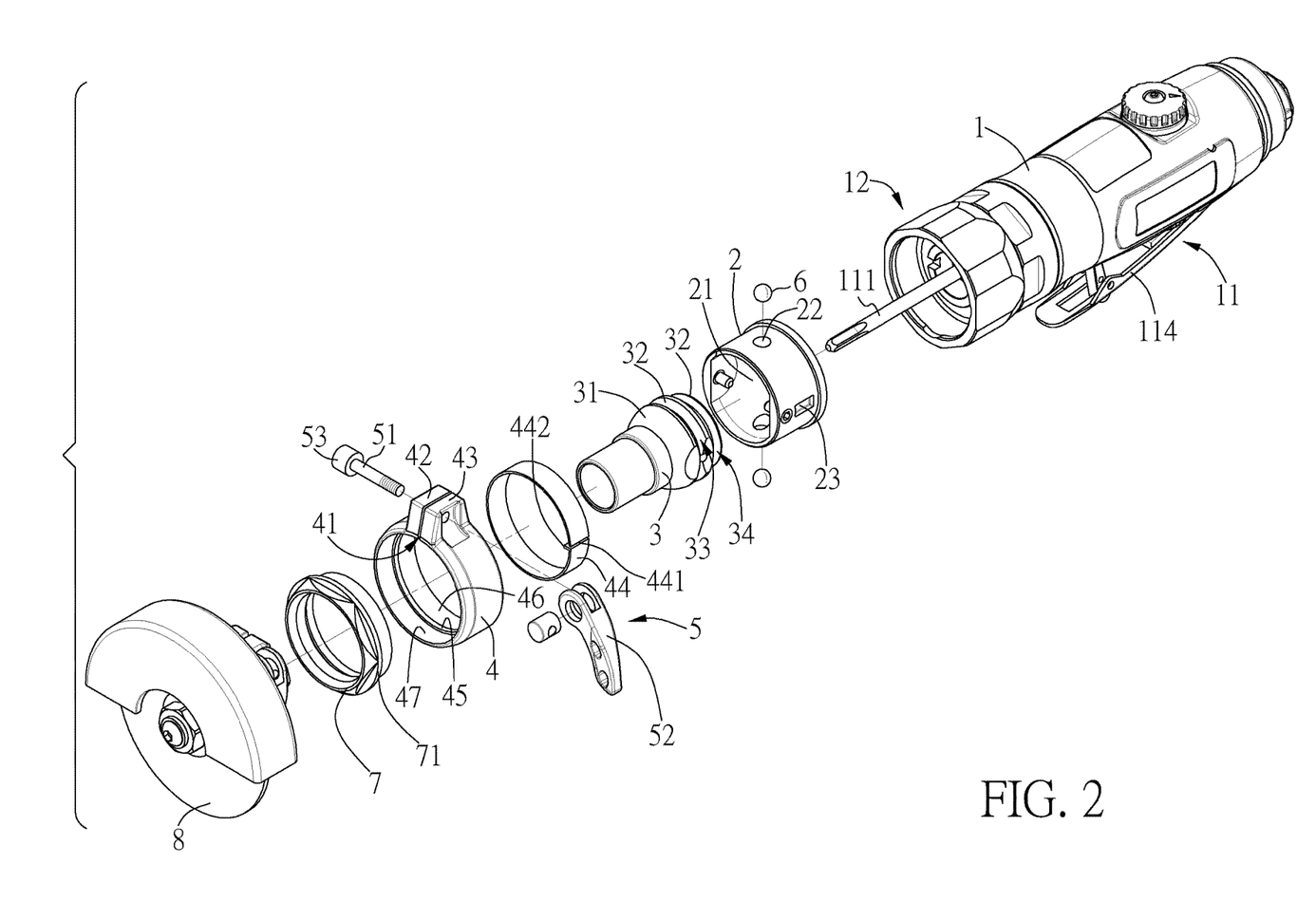
FIG. 2 is an exploded view of the handheld power tool.
Figure 3:
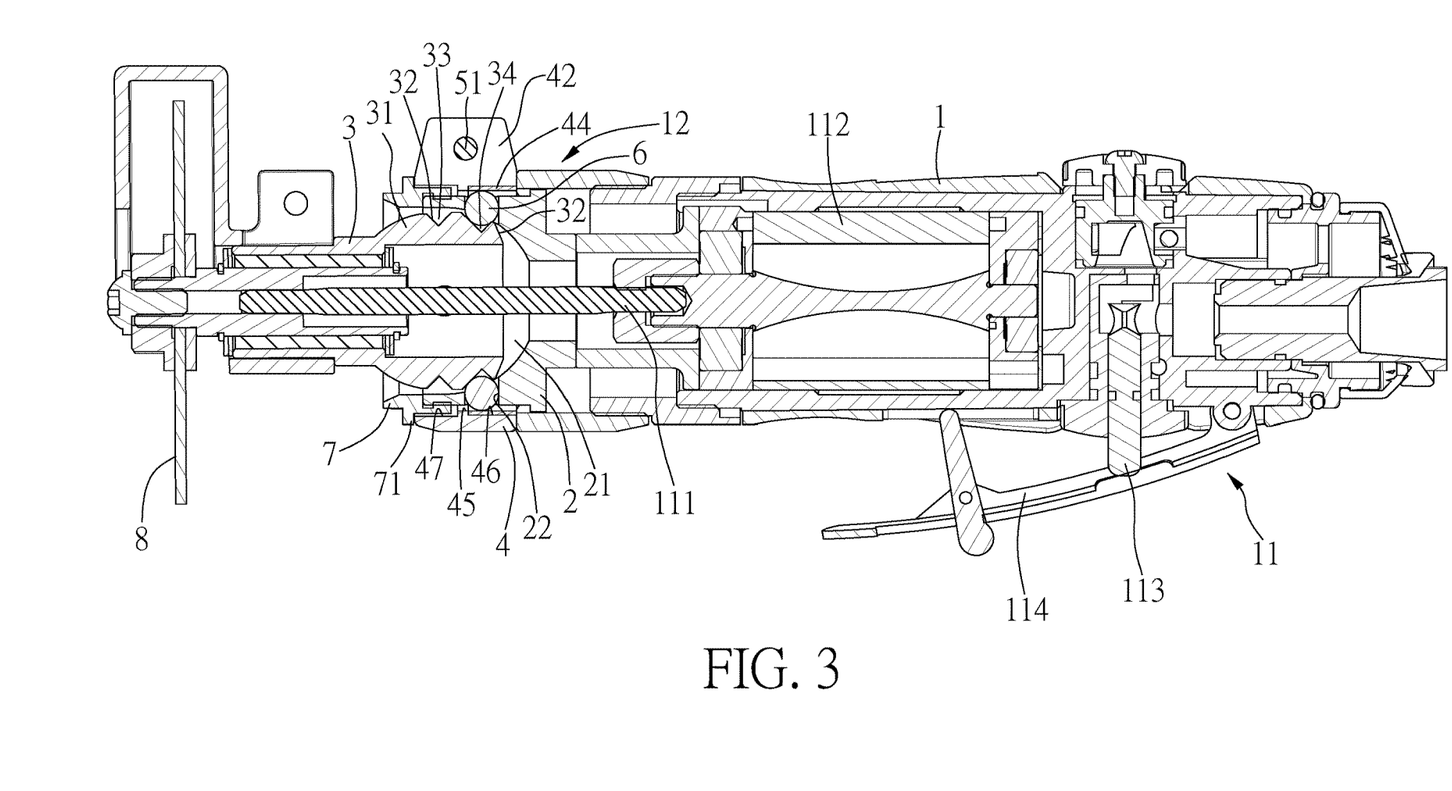
FIG. 3 is a cross-sectional view of the handheld power tool taken axially.

The present invention provides a handheld power tool, which is a pneumatic cutting machine herein as a preferred embodiment. As shown in FIG. 1 through FIG. 3, it comprises a main body 1, a connecting seat 2, a connector 3, a clamp 4, an adjusting member 5, a plurality of retaining balls 6, an end cap 7 and a workpiece 8.

As shown in FIGS. 2 and 3, the main body 1 contains therein a driving unit 11, and has a working end 12. The driving unit 11 has a driving shaft 111. The driving shaft 111 extends toward the working end 12. The driving shaft 111 is flexible and bendable. In the present embodiment, the driving unit 11 has, in addition to the driving shaft 111, a pneumatic motor 112, an air valve 113 and a pressing handle 114. The pressing handle 114 is configured to open the air valve 113 and introduce high-pressure gas that in turn rotates the pneumatic motor 112 to drive the driving shaft 111. In another embodiment, the driving unit 11 is powered by an electric motor instead of using the pneumatic motor 112 that is driven by the high-pressure gas.

As shown in FIGS. 2 and 3, the connecting seat 2 is attached to the working end 12 of the main body 1. The connecting seat 2 has a radially inward extending ball socket 21, and has a plurality of through holes 22 arranged at least at its two opposite sides. The through holes 22 radially extend to communicate with the ball socket 21. In the present embodiment, the connecting seat 2 has only two through holes 22 that are arranged at upmost and bottommost points of the connecting seat 2.

As shown in FIGS. 2 and 3, the connector 3 has a ball seat 31. The ball seat 31 is received in the ball socket 21. The ball seat 31 has its two opposite sides pivotally connected to the connecting seat 2, so that the ball seat 31 is swingable. The ball seat 31 is peripherally provided with a plurality of inclines 32 arranged successively in its axial direction. The inclines 32 are alternately aligned with the through holes 22 as the ball seat 31 swings. In the present embodiment, the ball seat 31 has two annular grooves 33, 34 arranged in tandem. Each of the annular grooves 33, 34 has a pair of inclines 32, and the ball seat 31 has its end inside the ball socket 21 also provided with another incline 32.

As shown in FIGS. 2 and 3, the clamp 4 is mounted around the connecting seat 2. The clamp 4 is a C-shaped member having two ends separated by a gap 41. The two ends each have a raised portions 42, 43. The adjusting member 5 has a stem 51 passing through the two raised portions 42, 43, and has a driving portion 52 connected to one end of the stem 51 so as to draw the two raised portions 42, 43 closer or separate them far away, thereby sizing the gap 41. When the gap 41 is narrowed, the clamp 4 is close, and when the gap 41 returns to its original wide position, the clamp 4 releases the connecting seat 2. The clamp 4 further has a spring leaf 44 configured to cover the through holes 22.

In the present embodiment, the adjusting member 5 is a quick release, and the driving portion 52 is a cam lever. The stem 51 is a bolt screwed into the driving portion 52. The stem 51 has its end opposite to the driving portion 52 provided with a retaining portion 53. By screwing or unscrewing the stem 51, a distance between the retaining portion 53 and the driving portion 52 can be changed. By setting a limit for the respect movement between the raised portions 42, 43 of the clamp 4, the gap 41 is limited in size. Thus, when operated, the driving portion 52 draw the two raised portions 42, 43 together to finally abut against each other or separate them far from each other fast.

As shown in FIGS. 2 and 3, a plurality of retaining balls 6 are settled in the through holes 22, respectively, and are retained by the clamp 4 so as to gall on the incline 32 aligned with the corresponding through holes 22. When the clamp 4 is tightened, the spring leaf 44 of the clamp 4 radially pushes the retaining balls 6 against the corresponding inclines 32, so as to make the ball seat 31 stay in the ball socket 21.

As shown in FIGS. 2 and 3, the end cap 7 is located at the end of the connecting seat 2 having the connector 3. In the present embodiment, the clamp 4 has its inner periphery provided with a first annular wall 45. At one side of the first annular wall 45, a first annular trough 46 is provided for receiving the spring leaf 44. At the other side of the first annular wall 45, a second annular trough 47 is formed for receiving the end cap 7. In the present embodiment, the end cap 7 has its outer periphery formed with a second annular wall 71. The second annular wall 71 is around the end of the connecting seat 2 with the end cap 7, so as to retain the clamp 4.

As shown in FIG. 3, the workpiece 8 is rotatably connected to the connector 3. The driving shaft 111 passes through the connecting seat 2 and the connector 3 before transmissibly connected to the workpiece 8. In the present embodiment, the workpiece 8 is a cutting blade, which is flexible when connected to and working with the driving shaft 111, so that the cutting angle of the workpiece 8 can be adjusted when the ball seat 31 of the connector 3 swing within and with respect to the ball socket 21 of the connecting seat 2.

As shown in FIGS. 2 and 3, according to the present embodiment, the spring leaf 44 is of a C shape with a gap 441 formed between two ends. One of the two ends of the spring leaf 44 has an inward extending retaining member 442. In the present embodiment, the connecting seat 2 has its outer periphery where the clamp 4 clamps formed with a recessed portion 23, so that when the spring leaf 44 is in the clamp 4, the retaining member 442 is received by the recessed portion 23, thereby preventing the spring leaf 44 from rotating with respect to the connecting seat 2.

Figure 4:
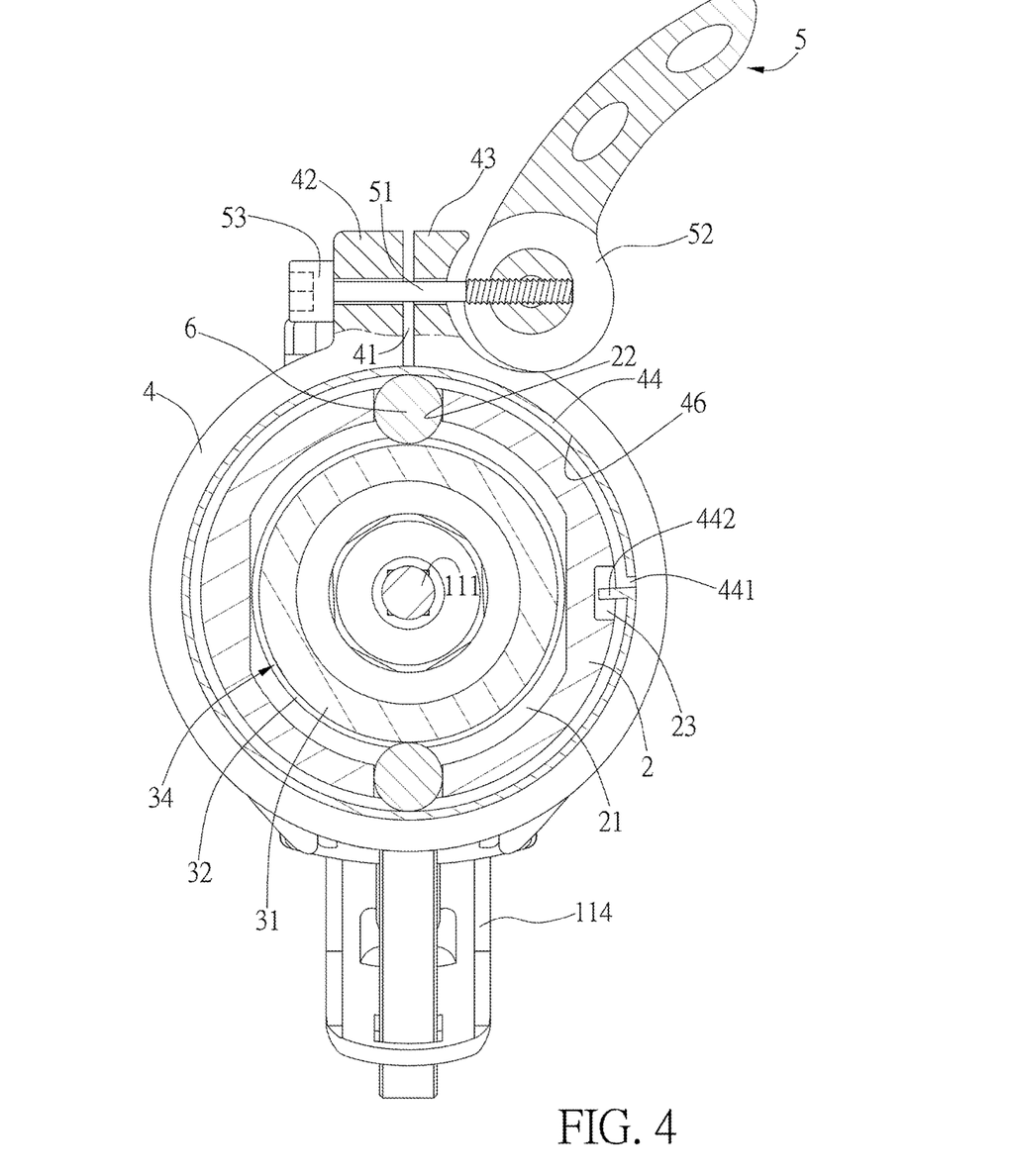
FIG. 4 is another cross-sectional view of the handheld power tool taken radially.
Figure 5:
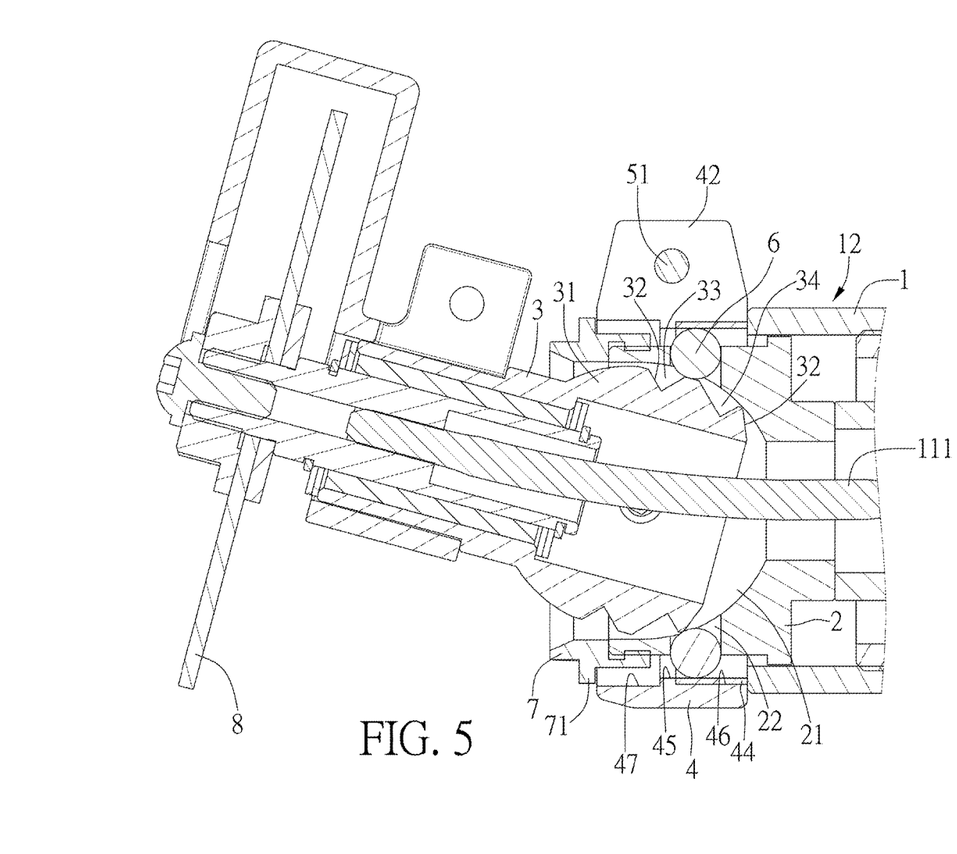
FIG. 5 shows the handheld power tool before its connector as shown in FIG. 3 is tilted up with respect to its connecting seat to a desired position, wherein retaining balls leave their corresponding incline and are pushed away by a ball seat, wherein at this time the clamp and the spring leaf are held open.
Figure 6:
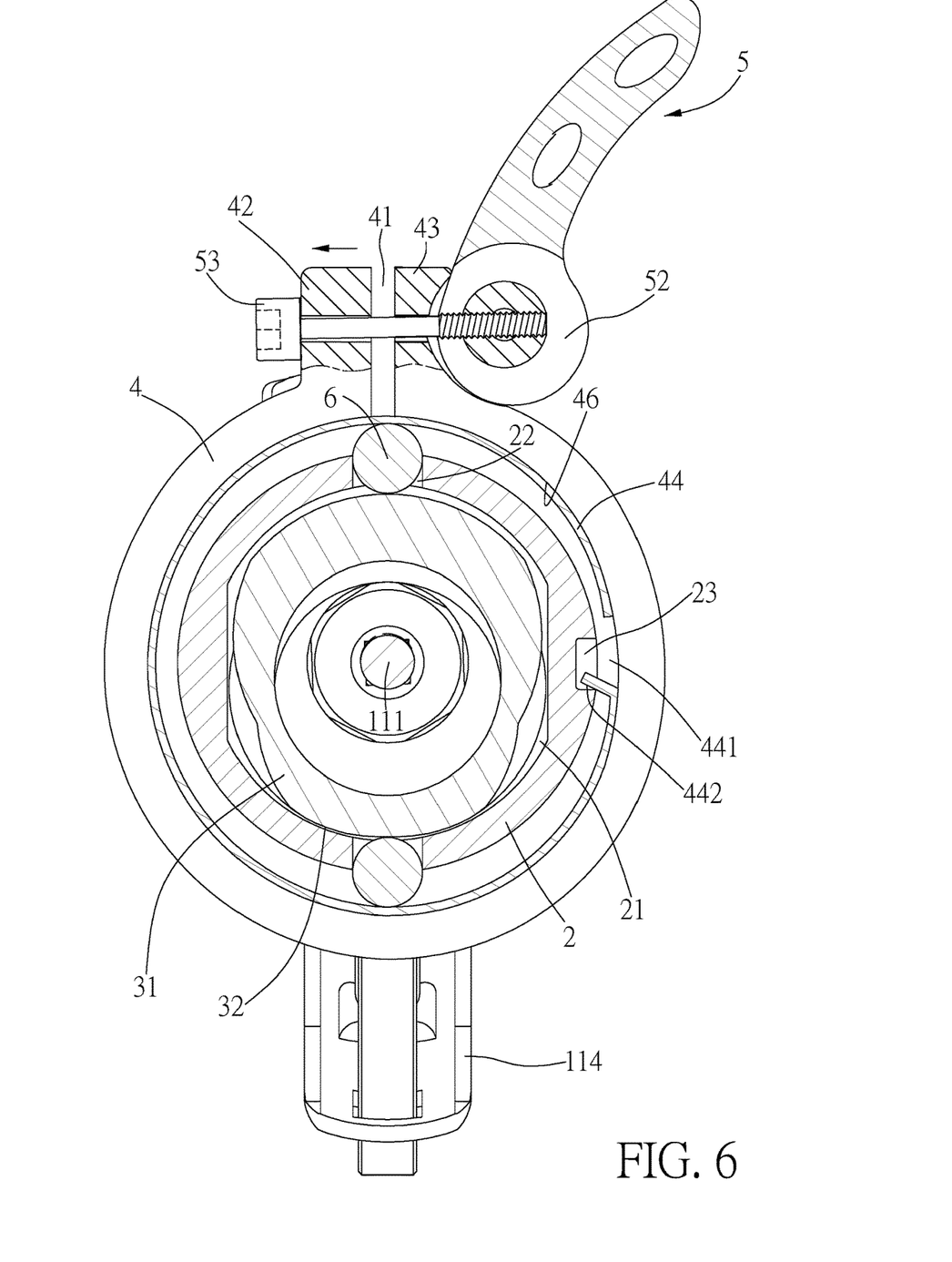
FIG. 6 shows the handheld power tool before its connector as shown in FIG. 4 is tilted up with respect to its connecting seat to a desired position, wherein the retaining balls leave their corresponding incline and are pushed away the ball seat, and the clamp and the spring leaf are held open as shown in FIG. 5.
Figure 7:
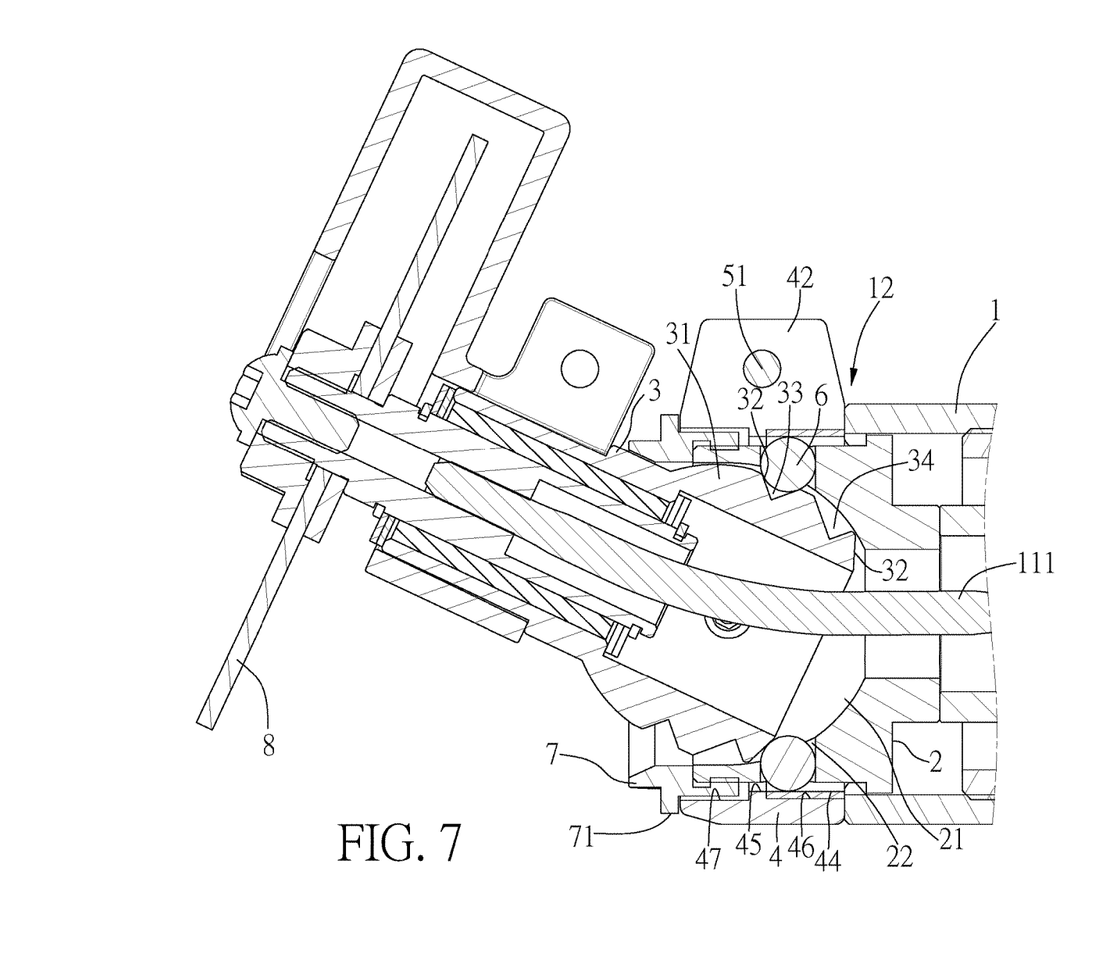
FIG. 7 shows the handheld power tool having its connector as shown in FIG. 5 tilted up to the desired position, wherein the retaining balls fall on the incline again, and at this time the clamp and the spring leaf are both constricted.
Figure 8:
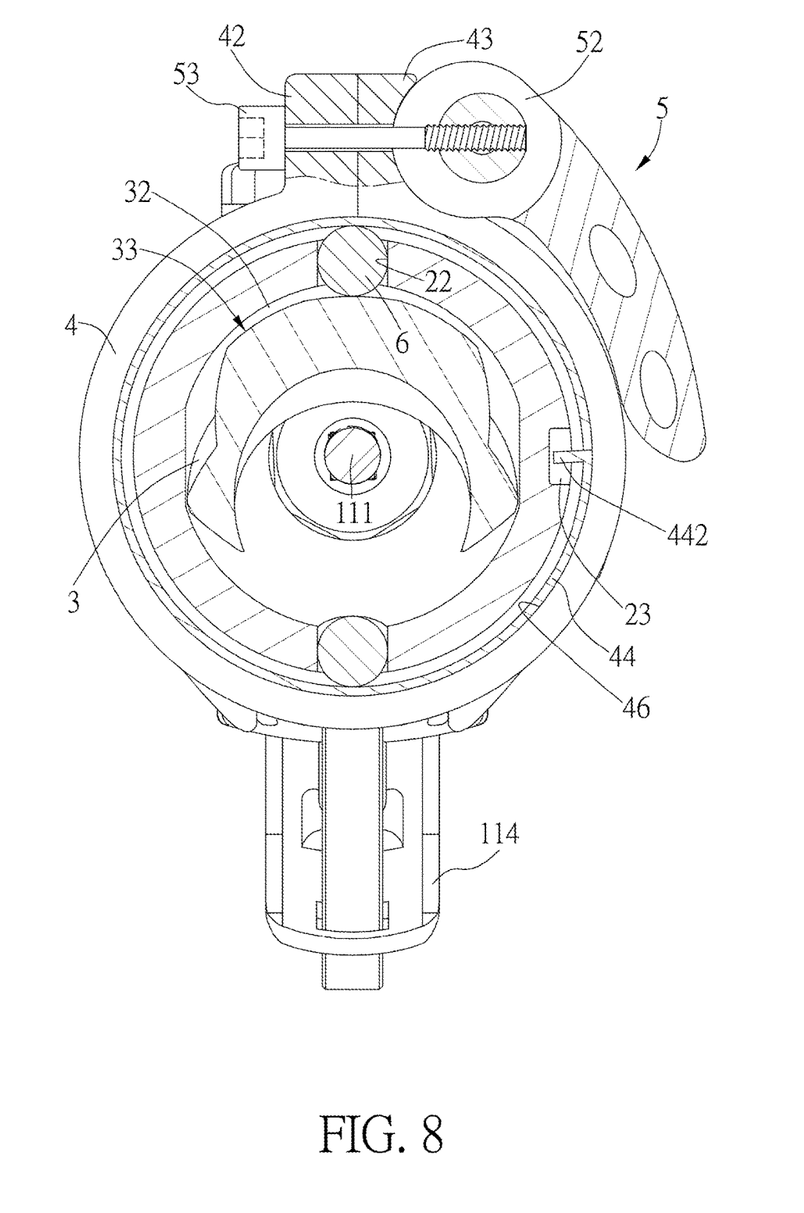
FIG. 8 shows the handheld power tool having its connector as shown in FIG. 6 tilted up to the desired position, wherein the retaining balls fall on the incline again, and at this time the clamp and the spring leaf are both constricted as shown in FIG. 7.

As shown in FIG. 4, in order to tilt the connector 3 upward or downward, the driving portion 52 is first operated to widen the gap 41. At this time, the clamp 4 is open, so the connector can be manually tilted up or down. In the present embodiment, the connector is now tilted up for 25 degrees. As shown in FIGS. 5 and 6, in the process where the connector 3 is tilted up, the retaining balls 6 are pushed away by the ball seat 31. Since the clamp 4 and the spring leaf 44 are both not closed, or are C-shaped, they can expand in response to the movement of the retaining balls 6, so that the retaining balls 6 transit from one incline 32 to another incline 32. Further, as shown in FIG. 7 and FIG. 8, when the connector 3 is tilted to the desired position, since the two raised portions 42, 43 are connected by the stem 51 and held from separation by the driving portion 52 and the retaining portion 53 at two sides, the retaining portion 53 together with the stem 51 can be screwed to a proper extent and the driving portion 52, which is now a cam lever, can be operated to draw the retaining portion 53 toward the driving portion 52, so that the two raised portions 42, 43 are drawn close to and finally abutting against each other, thereby fast narrowing the gap 41 and so constricting the clamp 4. At this time, the retaining balls 6 in the two opposite through holes 22 are pressed by the constricted spring leaf 44 and radially push against the incline 32, so that the retaining balls 6 fixes the ball seat 31 within ball socket 21 of the connecting seat 2, thereby holding the connector 3 at this tilted-up or tilted-down state.

From the description above it is clear the present invention has some advantages. The clamp 4 when affected by the adjusting member 5 can be constricted around the connecting seat 2, and the spring leaf 44 presses the retaining balls 6 radially against the corresponding incline 32. Therefore, with the clamp 4 that serves to size the gap 41, even if the incline 32 of the connector 3, the clamp 4 and the retaining balls 6 are made less precise, the adjusting member 5 can be used to control how tightly the clamp 4 clamps the connecting seat 2, to have the spring leaf 44 firmly press against the retaining balls 6, and maintain the force the spring leaf 44 radially exerts on the retaining balls 6, so as to ensure that the ball seat 31 is held firmly in the ball socket 21 of the connecting seat 2 by the retaining balls 6, thereby preventing the workpiece 8 from jigging within the connector 3 during operation. In this way, the workpiece 8 can work stably without jigging.

What is claimed is:

1. A handheld power tool comprising:
   a main body, containing therein a driving unit, and having a working end, the driving unit including a driving shaft that extends toward the working end, and the driving shaft being flexible and bendable;
   a connecting seat, being attached to the working end of the main body, and having a radially inward extending ball socket and a plurality of through holes at least arranged at two opposite sides thereof, wherein the through holes extend radially and communicate with the ball socket;
   a connector, having a ball seat received in the ball socket and having two opposite sides thereof pivotally connected to the connecting seat so as to be swingable, the ball seat having an outer periphery thereof formed with a plurality of inclines axially extending and arranged in tandem, wherein the inclines are alternately aligned with the through holes as the ball seat swings;
   a clamp, being mounted around an outer periphery of the connecting seat, and being C-shaped with a gap formed between two ends thereof, wherein each of the two ends is provided with a raised portion;
   an adjusting member, having a stem that passes through the two raised portions and having a driving portion connected to one end of the stem for drawing the two raised portions close to finally abut against each other or separating the two raised portions far away, so as to size the gap and in turn make the clamp constricted or released, and the clamp further having a spring leaf that covers the through holes;
   a plurality of retaining balls, being each received in a respective said through hole and retained by the clamp so as to fall on the incline aligned with the through holes, wherein when the clamp is constricted, the spring leaf of the clamp presses the retaining balls radially against the incline, so as to hold the ball seat within the ball socket;
   an end cap, being attached to one end of the connecting seat where the connector juts out; and
   a workpiece, being rotatably connected to the connector, wherein the driving shaft passes through the connecting seat and the connector before transmissibly connected to the workpiece.

2. The handheld power tool of claim 1, wherein the adjusting member is a quick release, and the driving portion is a cam lever, in which the stem is a bolt screwed to the driving portion has an end opposite to the driving portion formed with a retaining portion, so that screwing or unscrewing the stem changes a distance between the retaining portion and the driving portion, and the driving portion when operated makes the two raised portions drawn close to finally abut against each other or separated far away fast.

3. The handheld power tool of claim 1, wherein the spring leaf is C-shaped with a gap formed between two ends thereof and has one end thereof formed with an inward extending retaining member, while the connecting seat has an outer periphery thereof circled by the clamp formed with a recessed portion, so that when the spring leaf is located in the clamp, the retaining member is received by the recessed portion, thereby preventing the spring leaf from rotating with respect to the connecting seat.

4. The handheld power tool of claim 3, wherein the clamp has an inner periphery thereof formed with a first annular wall that has one side thereof formed with a first annular trough for receiving the spring leaf and has an opposite side formed with a second annular trough for receiving the end cap.

5. The handheld power tool of claim 4, wherein the end cap has an outer periphery thereof provided with a second annular wall that retains the clamp when the end cap is attached to the end of the connecting seat.

6. The handheld power tool of claim 1, wherein the ball seat has two annular grooves arranged in tandem, each of which has a pair of said inclines, and the ball seat additionally has one said incline at an end thereof that is received in the ball socket.

\* \* \* \* \*